United States Patent
Westendorf et al.

(10) Patent No.: US 9,919,261 B2
(45) Date of Patent: Mar. 20, 2018

(54) METHODS AND SYSTEMS FOR $CO_2$ SEPARATION

(71) Applicant: General Electric Company, Schenectady, NY (US)

(72) Inventors: Tiffany Elizabeth Pinard Westendorf, Troy, NY (US); Benjamin Rue Wood, Niskayuna, NY (US); Sarah Elizabeth Genovese, Delmar, NY (US); John Brian McDermott, Rexford, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/088,877

(22) Filed: Apr. 1, 2016

(65) Prior Publication Data

US 2016/0214058 A1    Jul. 28, 2016

Related U.S. Application Data (62) Division of application No. 13/429,503, filed on Mar. 26, 2012, now Pat. No. 9,427,697.

(51) Int. Cl.
*B01D 53/02*    (2006.01)
*B01D 53/14*    (2006.01)
(Continued)

(52) U.S. Cl.
CPC ..... *B01D 53/1475* (2013.01); *B01D 53/1425* (2013.01); *B01D 53/1493* (2013.01);
(Continued)

(58) Field of Classification Search
CPC ...... B01D 2252/204; B01D 2252/2053; B01D 2252/40; B01D 2257/504;
(Continued)

(56) References Cited

U.S. PATENT DOCUMENTS 4,129,739 A    12/1978    Tracy et al.
4,162,280 A    7/1979    Kranz
(Continued)

FOREIGN PATENT DOCUMENTS

EP    0588175 A2    3/1994
WO    2003095071 A1    11/2003
(Continued)

OTHER PUBLICATIONS

Pennline et al.,"Carbon Dioxide Capture and Separation Techniques for Advanced Power Generation Point Sources",National Energy Technology Laboratory, 2006, 10 Pages.
(Continued)

*Primary Examiner* — Christopher P Jones
(74) *Attorney, Agent, or Firm* — John P. Darling (57) ABSTRACT

A method for separating carbon dioxide ($CO_2$) from a gas stream is provided. The method includes reacting at least a portion of $CO_2$ in the gas stream with a plurality of liquid sorbent particles to form a plurality of solid adduct particles and a first $CO_2$-lean gas stream; the solid adduct particles entrained in the first $CO_2$-lean gas stream to form an entrained gas stream. The method includes separating at least a portion of the plurality of solid adduct particles from the entrained gas stream in a separation unit to form an adduct stream and a second $CO_2$-lean gas stream. The method further includes heating at least a portion of the adduct stream in a desorption unit to form a $CO_2$ stream and a regenerated liquid sorbent stream. A system for separating $CO_2$ from a gas stream is also provided.

10 Claims, 3 Drawing Sheets

(51) Int. Cl.
- *B01D 53/77* (2006.01)
- *B01D 53/62* (2006.01)
- *B01D 53/96* (2006.01)

(52) U.S. Cl.
CPC ............ *B01D 53/62* (2013.01); *B01D 53/77* (2013.01); *B01D 53/96* (2013.01); *B01D 2252/204* (2013.01); *B01D 2252/2053* (2013.01); *B01D 2252/40* (2013.01); *B01D 2257/504* (2013.01); *B01D 2259/124* (2013.01); *Y02C 10/04* (2013.01); *Y02C 10/06* (2013.01)

(58) Field of Classification Search
CPC .......... B01D 2259/124; B01D 53/1425; B01D 53/1475; B01D 53/1493; B01D 53/62; B01D 53/77; B01D 53/96; Y02C 10/04; Y02C 10/06
See application file for complete search history.

(56) References Cited

U.S. PATENT DOCUMENTS

| | | | |
|---|---|---|---|
| 4,405,579 A | 9/1983 | Sartori et al. | |
| 4,406,867 A | 9/1983 | Marcinkowsky et al. | |
| 4,487,833 A | 12/1984 | Donahoe et al. | |
| 5,939,574 A | 8/1999 | Schilling, Jr. et al. | |
| 6,117,995 A | 9/2000 | Zedda et al. | |
| 6,187,277 B1 | 2/2001 | Kirschner | |
| 7,641,717 B2 | 1/2010 | Gal | |
| 7,718,151 B1 | 5/2010 | Hu | |
| 7,842,126 B1 | 11/2010 | Dilmore et al. | |
| 7,901,485 B2 | 3/2011 | McCutchen | |
| 7,918,906 B2 | 4/2011 | Zubrin et al. | |
| 7,927,403 B2 | 4/2011 | Versteeg et al. | |
| 7,947,239 B2 | 5/2011 | Lackner et al. | |
| 8,764,890 B2* | 7/2014 | Yi ........................ | B01D 53/10 422/144 |
| 2003/0113239 A1 | 6/2003 | Pahlman et al. | |
| 2008/0072762 A1 | 3/2008 | Gal | |
| 2009/0291874 A1 | 11/2009 | Bara et al. | |
| 2010/0236408 A1 | 9/2010 | Asprion et al. | |
| 2011/0100217 A1* | 5/2011 | Soloveichik ....... | B01D 53/1475 95/179 |
| 2011/0116998 A1* | 5/2011 | Van Straelen ..... | B01D 53/1475 423/230 |
| 2011/0232490 A1 | 9/2011 | Ji et al. | |
| 2012/0027664 A1* | 2/2012 | Pinard Westendorf ........ | B01D 53/1475 423/437.1 |
| 2012/0207659 A1 | 8/2012 | Westendorf et al. | |
| 2013/0298761 A1* | 11/2013 | Hamad .................... | F01N 3/04 95/11 |

FOREIGN PATENT DOCUMENTS

| | | |
|---|---|---|
| WO | 2008072979 A1 | 6/2008 |
| WO | 2009153351 A1 | 12/2009 |

OTHER PUBLICATIONS

Kitchens, et al.; Reversible Gelation of Polyethyleneimine Solutions Using CO2; AIChE Annual Meeting, San Francisco, CA; 2006; Entry 520f of Proceedings; 2 Pages.

Occupational Safety and Health Administration; Remediation Technology Health and Safety Hazards: Thermal Desorption; SHIB 02-03-03; http://www.osha.gov/dts/shib/shib_02_03_03_tsds9.pdf; 14 Pages.

Yamada et al.,"Reversible, Room-Temperature Ionic Liquids. Amidinium Carbamates Derived from Amidines and Aliphatic Primary Amines with Carbon Dioxide", Chem. Mater. 2007, vol. 19, pp. 967-969.

Mahmoudkhani et al.,"Low-Energy Sodium Hydroxide Recovery for Co2 Capture from Atmospheric Air Thermodynamic Analysis",International Journal of Greenhouse Gas Control,vol. 3, 2009, Issue 4, pp. 376-384.

Search Report and Written Opinion from corresponding EP Application No. 11175659.1213 dated Nov. 10, 2011, 7 Pages.

* cited by examiner

METHODS AND SYSTEMS FOR $CO_2$ SEPARATION

CROSS REFERENCE TO RELATED APPLICATIONS

This application is a divisional of U.S. patent application Ser. No. 13/429503 entitled "METHODS AND SYSTEMS FOR $CO_2$ SEPARATION" filed on Mar. 26, 2012, which is herein incorporated by reference.

STATEMENT REGARDING FEDERALLY SPONSORED RESEARCH & DEVELOPMENT

This invention was made with Government support under contract number DE-AR000084, awarded by the DOE. The Government has certain rights in the invention.

BACKGROUND

Technical Field

The present disclosure relates to methods and systems for carbon dioxide ($CO_2$) separation. More particularly, the present disclosure relates to methods and systems for sorbent-based $CO_2$ separation.

Discussion of Related Art

Power generating processes that are based on combustion of carbon containing fuel typically produce $CO_2$ as a byproduct. It may be desirable to capture or otherwise separate the $CO_2$ from the gas mixture to prevent the release of $CO_2$ into the environment and/or to utilize $CO_2$ in the power generation process or in other processes.

However, typical $CO_2$ capture processes, such as, for example, aqueous amine-based process may have limitations, for example, the process can sometimes result in sharp increases in the viscosity of the liquid absorbent, which can decrease the mass transfer of $CO_2$ into the sorbent. To avoid this problem, the concentration of amines in the absorbent stream may be maintained at low levels (using carrier solvents), which may greatly reduce absorbing capacity, as compared to the theoretical capacity of the neat absorbent. Moreover, energy consumption in the amine process may be high, due in large part to the need for heating and evaporation of carrier solvent (for example, water). Another example of a commercial $CO_2$ post-combustion capture process may use aqueous solutions of piperazine-promoted potassium carbonate ($K_2CO_3$) that has disadvantages similar to the amine process because of the additional solvent. Further, this process is often very energy-intensive, and may be economically inferior to the amine process.

Thus, there is a need for efficient methods and systems for separation of $CO_2$. Further, there is a need for efficient methods and systems for sorbent-based separation of $CO_2$.

BRIEF DESCRIPTION

In accordance with one aspect of the present invention, a method for separating carbon dioxide ($CO_2$) from a gas stream is provided. The method includes contacting a first liquid sorbent stream comprising a plurality of liquid sorbent particles with the gas stream in a reaction chamber. The method includes reacting at least a portion of $CO_2$ in the gas stream with the plurality of liquid sorbent particles to form a plurality of solid adduct particles and a first $CO_2$-lean gas stream, wherein the plurality of solid adduct particles is entrained in the first $CO_2$-lean gas stream to form an entrained gas stream. The method includes contacting the entrained gas stream with a second liquid sorbent stream in a separation unit, thereby separating at least a portion of the plurality of solid adduct particles from the entrained gas stream to form an adduct stream and a second $CO_2$-lean gas stream. The method further includes heating at least a portion of the adduct stream in a desorption unit to form a $CO_2$ stream and a regenerated liquid sorbent stream.

In accordance with another aspect of the present invention a method for separating carbon dioxide ($CO_2$) from a gas stream is provided. The method includes contacting a first liquid sorbent stream comprising a plurality of liquid sorbent particles with the gas stream in a reaction chamber. The method includes reacting at least a portion of $CO_2$ in the gas stream with the plurality of liquid sorbent particles to form a plurality of solid adduct particles, wherein the solid adduct particles are entrained in the gas stream to form an entrained gas stream. The method includes contacting the entrained gas stream with a second liquid sorbent stream in a separation unit, thereby separating at least a portion of the plurality of solid adduct particles from the entrained gas stream to form an adduct stream and a $CO_2$-lean gas stream. The method includes contacting the adduct stream with a third liquid sorbent stream in a suspension unit to form a slurry, and transporting the slurry to a desorption unit. The method further includes heating at least a portion of the slurry to form a $CO_2$ stream and a regenerated liquid sorbent stream; and circulating at least a portion of the regenerated liquid sorbent stream to the separation unit.

In accordance with yet another aspect of the present invention, a system for separating carbon dioxide ($CO_2$) from a gas stream is provided. The system includes a reaction chamber configured to receive a first liquid sorbent stream and the gas stream, wherein the reaction chamber is configured to react at least a portion of $CO_2$ in the gas stream with the liquid sorbent to form an entrained gas stream comprising a plurality of solid adduct particles. The system includes a separation unit in fluid communication with the reaction chamber, wherein the separation unit is configured to receive the entrained gas stream and a second liquid-sorbent stream, and wherein the separation unit is configured to separate at least a portion of the plurality of solid adduct particles from the entrained gas stream to form an adduct stream and $CO_2$-lean gas stream. The system further includes a desorption unit in fluid communication with the separation unit, wherein the desorption unit is configured to receive the adduct stream, and wherein the desorption unit is configured to decompose the plurality of solid adduct particles to form a $CO_2$ stream and a regenerated liquid-sorbent stream.

Other embodiments, aspects, features, and advantages of the invention will become apparent to those of ordinary skill in the art from the following detailed description, the accompanying drawings, and the appended claims.

BRIEF DESCRIPTION OF THE DRAWING FIGURES

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include methods and systems suitable for $CO_2$ separation. As discussed in detail below, embodiments of the present invention include methods and systems for high efficiency and cost-effective $CO_2$ separation from a gas stream using liquid sorbent systems. In particular embodiments, the methods and systems for $CO_2$ separation include a separation unit configured to enable solids disengagement, aerosol disengagement, $CO_2$ absorption, and slurry formation in a single process unit. This may advantageously result in one or more of reduced materials and capital cost, increased efficiency, simplified $CO_2$ capture process, or reduced overall footprint of the system.

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In some instances, the approximating language may correspond to the precision of an instrument for measuring the value.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Figure 1:
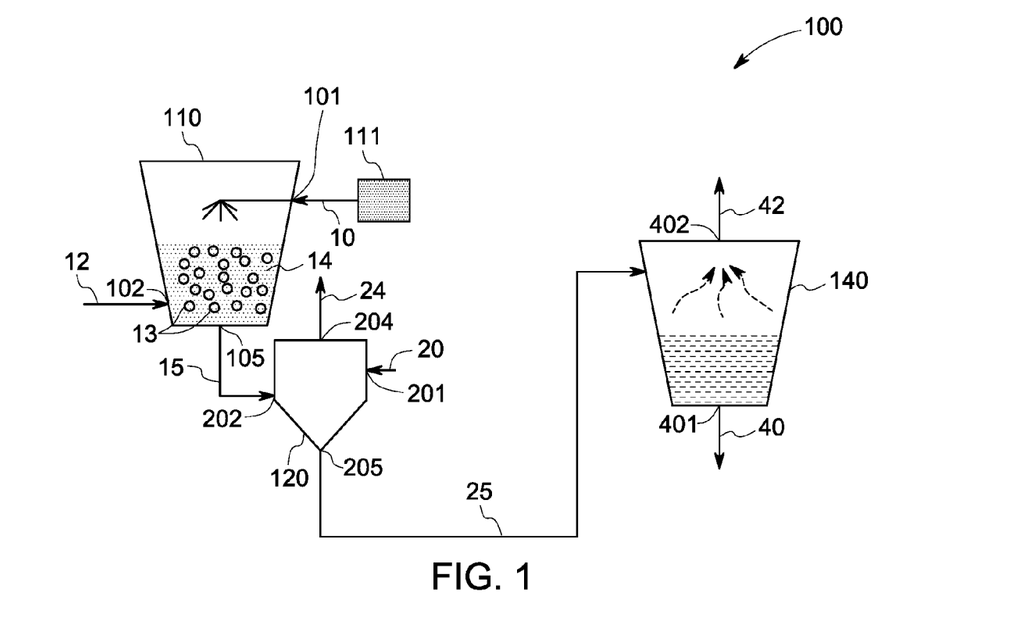
FIG. 1 is a schematic illustration of a system for $CO_2$ separation from a gas stream, in accordance with one embodiment of the invention.
Figure 2:
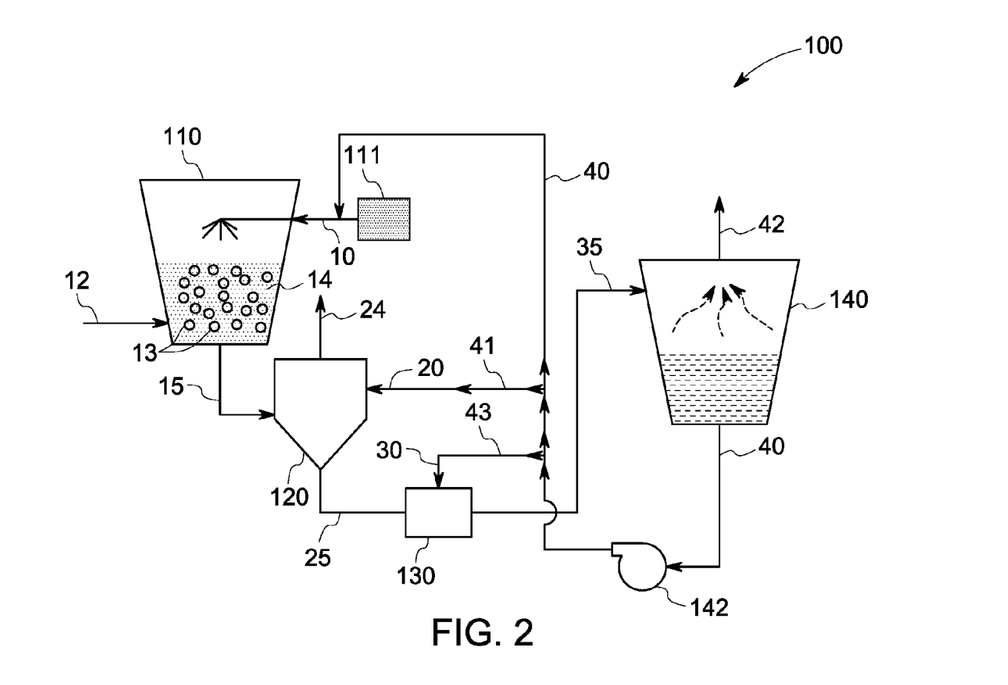
FIG. 2 is a schematic illustration of a system for $CO_2$ separation from a gas stream, in accordance with one embodiment of the invention.
Figure 3:
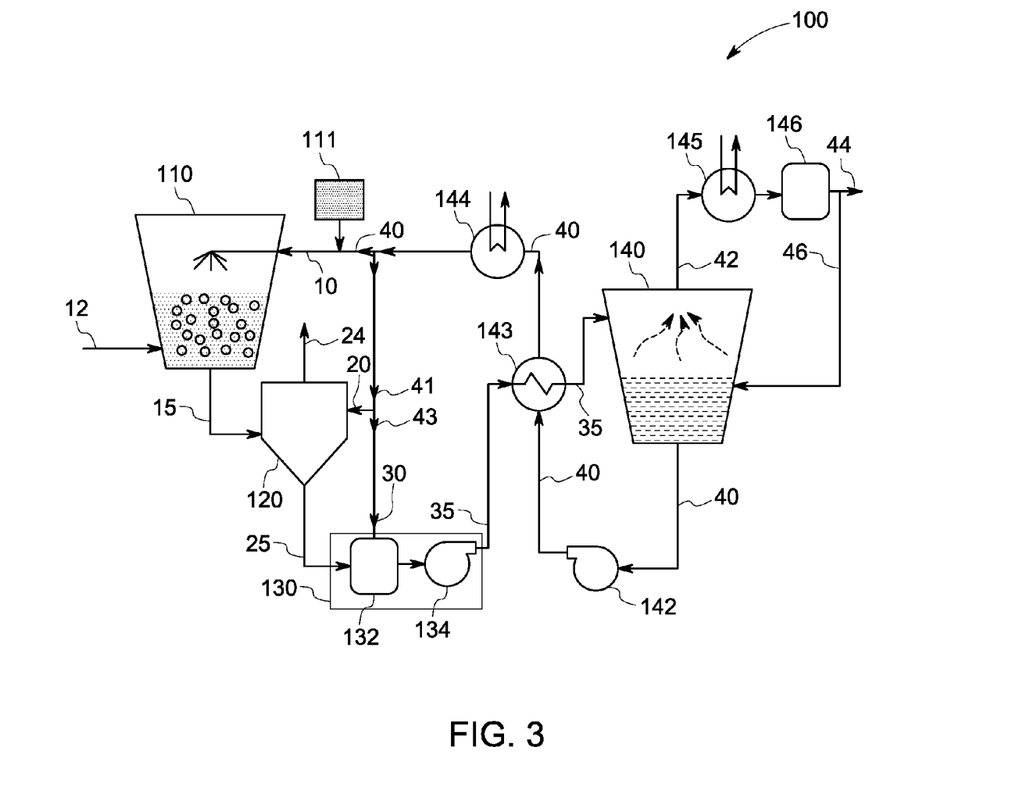
FIG. 3 is a schematic illustration of a system for $CO_2$ separation from a gas stream, in accordance with one embodiment of the invention.

In some embodiments, as shown in FIGS. 1-3, a method for separating carbon dioxide ($CO_2$) from a gas stream 12 is provided. The term "gas stream" as used herein refers to a gas mixture, which may further include one or both of solid and liquid components. In some embodiments, the gas stream 12 is a product from a combustion process, a gasification process, a landfill, a furnace, a steam generator, a boiler, or combinations thereof. In one embodiment, the gas stream 12 includes a gas mixture emitted as a result of the processing of fuels, such as, natural gas, biomass, gasoline, diesel fuel, coal, oil shale, fuel oil, tar sands, and combinations thereof. In some embodiments, the gas stream 12 includes a gas mixture emitted from a gas turbine. In some embodiments, the gas stream 12 includes syngas generated by gasification or a reforming plant. In some embodiments, the gas stream 12 includes a flue gas. In particular embodiments, the gas stream 12 includes a gas mixture emitted from a coal or natural gas-fired power plant.

As noted earlier, the gas stream 12 includes carbon dioxide. In some embodiments, the gas stream 12 further includes one or more of nitrogen, oxygen, or water vapor. In some embodiments, the gas stream 12 further includes impurities or pollutants, examples of which include, but are not limited to, nitrogen oxides, sulfur oxides, carbon monoxide, hydrogen sulfide, unburnt hydrocarbons, particulate matter, and combinations thereof. In some embodiments, the gas stream 12 is substantially free of the impurities or pollutants. In some embodiments, the gas stream 12 includes nitrogen, oxygen, and carbon dioxide. In some embodiments, the gas stream 12 includes nitrogen and carbon dioxide. In some embodiments, the gas stream 12 includes carbon monoxide. In some embodiments, the gas stream 12 includes syngas.

In some embodiments, the amount of impurities or pollutants in the gas stream 12 is less than about 50 mole percent. In some embodiments, the amount of impurities or pollutants in the gas stream 12 is in a range from about 10 mole percent to about 20 mole percent. In some embodiments, the amount of impurities or pollutants in the gas stream 12 is less than about 5 mole percent.

In some embodiments, the method may further include receiving a gas stream 12, from a hydrocarbon processing, combustion, gasification or a similar power plant (not shown), in the reaction chamber 110 via at least one inlet 102, as indicated in FIG. 1. In some embodiments, the gas stream 12 may be provided to the reaction chamber 110 via a plurality of inlets 102 (not shown), located at different positions in the reaction chamber 110. In some embodiments, the gas stream 12 may be further subjected to one or more processing steps (for example, removing water vapor, impurities, and the like) before providing the gas stream 12 to the reaction chamber 110.

In some embodiments, as indicated in FIG. 1, the inlet 102 for the gas stream 12 is located in a lower region of the reaction chamber 110, relative to the inlet 101 for the first liquid sorbent stream 10. In some embodiments, the gas stream 12 is advantageously provided to the reaction chamber 110 at a location such that an induced countercurrent flow exposes the gas stream, when it has the lowest $CO_2$ concentration, to the freshest liquid sorbent. Further, the gas stream with the highest $CO_2$ concentration is exposed to the liquid sorbent stream that has substantially reacted with the $CO_2$. Furthermore, in some embodiments, this type of flow scheme may permit the resulting solid material to agglomerate more readily, leading to faster solidification.

In some embodiments, the flow rate of the gas stream 12 entering the reaction chamber 110 may be chosen to enable the desired $CO_2$ removal, for example, to provide the residence time to reduce the $CO_2$ level in the gas stream to a desired value. In some embodiments, the inlet pressure may depend on the design and operating conditions of the reaction chamber as well as the type of atomizer, as described below.

In some embodiments, the reaction chamber 110 is configured to provide contact between the first liquid sorbent stream 10 and the gas stream 12 such that reaction of the liquid sorbent with the $CO_2$ can occur. In some embodiments, the reaction chamber 110 is configured to operate under the desired reaction conditions (for example, temperature and pressure) depending on the specific liquid sorbent utilized. In some embodiments, the reaction chamber 110 may be configured to operate at atmospheric pressure. In some embodiments, the reaction chamber may be configured to operate at a temperature in a range from about 20 degrees Celsius to about 70 degrees Celsius. Non-limiting examples of suitable reaction chambers may include a spray tower, a venturi scrubber, or combinations thereof. Moreover, while a vertical chamber is depicted in FIGS. 1-3, it is to be understood that a horizontally-oriented chamber might alternatively be used.

In some embodiments, the method includes contacting a first liquid sorbent stream 10 with the gas stream 12 in a reaction chamber 110, as indicated in FIGS. 1-3. The term "liquid sorbent stream" as used herein refers to a stream of liquid sorbent or a sorbent that is in a liquid state. In some embodiments, the liquid sorbent may be characterized by a melting temperature or a glass transition temperature lower than the operating temperature of the system 100.

As described in detail below, the liquid sorbent, in accordance with the embodiments of the invention, is in a liquid state, as compared to solid carbonate-based sorbent systems that further require additional carrier solvents (for example, aqueous solutions). Furthermore, the liquid sorbent along with being in a liquid form is itself capable of reacting with the $CO_2$ in the gas stream, as compared to ionic liquids-based sorption systems that include additional sorbent materials, such as, amines.

In some embodiments, the first liquid sorbent stream is substantially free of a co-solvent or a carrier fluid (for example, ionic liquids). The term "substantially free" as used herein means that the amount of co-solvent or a carrier fluid in the liquid sorbent stream is less than about 10 volume percent. In some embodiments, the amount of co-solvent or a carrier fluid in the first liquid sorbent stream is less than about 5 volume percent. In some embodiments, the first liquid sorbent stream is substantially free of a solvent selected from the group consisting of water, ionic liquids, and combinations thereof. In particular embodiments, the method includes utilizing a non-aqueous first liquid sorbent stream for separating $CO_2$ from the gas stream 12.

As noted earlier, conventional $CO_2$ sorbent systems utilize sorbents mixed with a non-absorbing carrier fluid (such as, for example, ammonia, water, or glycol), which leads to increase in volume of the sorbent stream and simultaneous reduction in absorption capacity of the sorbent stream by volume. Accordingly, the conventional $CO_2$ separation systems require larger reactor capacities (which may lead to increase in capital cost) and also require additional energy to pump, heat, and cool the carrier fluid (which may lead to increase in operating cost). In contrast, by using liquid sorbents, in accordance with some embodiments of the invention, use of co-solvent or carrier fluids may be excluded, which may lead to efficient and cost-effective $CO_2$ separation systems. Further, by not diluting the sorbent, a step in the process and the system equipment associated therewith may be excluded. In some embodiments, the first liquid stream 10 may further include one or more additives, such as, for example, anti-oxidants, stabilizers, and the like.

In some embodiments, the liquid sorbent includes any suitable material capable of being converted to a solid by chemical reaction with carbon dioxide. In some embodiments, the liquid sorbent includes a monomer, an oligomer, a polymer, or combinations thereof. In some embodiments, the liquid sorbent includes an amino siloxane moiety. Suitable examples of liquid sorbents are described in copending patent applications Ser. No. 12/343905 (Genovese et al), filed on 24 Dec. 2008; Ser. No. 12/512577 (Perry et al), filed on 30 Jul. 2009; Ser. No. 12/512105 (Perry et al), filed on 30 Jul. 2009; Ser. No. 12/817276 (Perry et al), filed on 17 Jun. 2010, all of which are incorporated by reference in their entirety, so long as not directly contradictory with the teachings herein.

In some embodiments, the liquid sorbent includes an amino-siloxane moiety having a formula (I):

wherein R is a $C_1$-$C_6$ aliphatic radical; $R_1$ is independently at each occurrence a $C_1$-$C_8$ aliphatic or aromatic radical; $R_2$ is $R_1$ or $RNR_3R_4$, wherein $R_3$ and $R_4$ are independently at each occurrence a bond, hydrogen, or a $C_1$-$C_8$ aliphatic radical.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical, which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. The term "a $C_3$-$C_{io}$ aromatic radical" includes aromatic radicals containing at least three but no more than 10 carbon atoms. The aromatic radical 1-imidazolyl ($C_3H_2N_2$-) represents a $C_3$ aromatic radical. The benzyl radical ($C_7H_7$—) represents a $C_7$ aromatic radical.

As used herein the term "aliphatic radical" refers to an organic radical having a valence of at least one consisting of a linear or branched array of atoms, which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —$CH_2CHBrCH_2$—), and the like. By way of further example, a $C_1$-$C_{10}$ aliphatic radical contains at least one but no more than 10 carbon atoms. A methyl group (i.e., $CH_3$-) is an example of a $C_1$ aliphatic radical. A decyl group (i.e., $CH_3(CH_2)_9$—) is an example of a $C_{10}$ aliphatic radical.

In some embodiments, the liquid sorbent includes an amino siloxane moiety having a formula (II)

In some embodiments, the method may further include a step of receiving a first liquid sorbent stream 10 in the reaction chamber 110 via at least one inlet 101. In some embodiments, the system 100 may further include a liquid sorbent source 111 in fluid communication with the inlet 101 of the reaction chamber 110, as indicated in FIG. 1. In some embodiments, the method may include providing a plurality of first liquid sorbent streams 10 via a plurality of inlets 101 in the reaction chamber 110 (not shown).

In some embodiments, the first liquid sorbent stream 10 in the reaction chamber 110 includes a plurality of liquid sorbent particles. The term "liquid sorbent particles" and "liquid sorbent droplets" are used interchangeably herein. In some embodiments, the method further includes subjecting the first liquid sorbent stream to a dispersing mechanism such that the first liquid stream is converted to a plurality of liquid sorbent particles in the reaction chamber 110.

In some embodiments, an atomizer (not shown) may be disposed in fluid communication with the reaction chamber 110 to disperse the first liquid sorbent stream 10 into droplets. Suitable examples of atomizers may include a nozzle, an orifice, or combinations thereof. In some embodiments, an atomizing gas (for example, air) may be supplied to the reaction chamber 110. Alternatively, or in addition, the atomizer may be designed to atomize the liquid sorbent due to the pressure of the reaction chamber 110 and the atomizer inlet size into the reaction chamber 110. In some embodiments, the atomizer may be located near the inlet 101. In some embodiments, the atomizer may be co-located with the inlet 101 or alternately may be incorporated into a portion of the inlet 101. In some further embodiments, a plurality of atomizers (for example, nozzles) may be positioned in the reaction chamber 110 at different heights, to maximize the number of the sorbent droplets.

In some embodiments, the method further includes dispersing the liquid sorbent to form liquid sorbent particles having a desired size. In some embodiments, the selected size for the liquid sorbent particles may depend on factors, such as the composition of the sorbent (for example, the reactivity of the sorbent with $CO_2$ gas); and the type and design of the reaction chamber 110. In some embodiments, an average diameter of the plurality of liquid sorbent particles is less than or equal to about 1,000 micrometers (µm). In some embodiments, an average diameter of the plurality of liquid sorbent particles is in a range from about 10 micrometers to about 100 micrometers.

In some embodiments, the method further includes reacting at least a portion of $CO_2$ in the gas stream 12 with the liquid sorbent to form a plurality of solid adduct particles 13, as indicated in FIG. 1. The term "adduct" as used herein refers to a reaction product of liquid sorbent and $CO_2$. In some embodiments, the adduct includes a carbamate moiety, a bicarbonate moiety, or combinations thereof. In some embodiments, as mentioned previously, the chemical reaction between the $CO_2$ in the was stream 12 and the liquid sorbent particles results in the formation of solid adduct particles 13.

In some embodiments, one or more size, shape, and density of the plurality of solid adduct particles 13 depend on one or more of size of the liquid sorbent droplets, the content of the liquid sorbent, the residence time within the reaction chamber, or the gas stream flow rate. In some embodiments, the plurality of solid adduct particles 13 are small enough to solidify to at least a non-sticky surface texture, but large enough to provide a sufficient mass for effective transport out of the reaction chamber 110. In some embodiments, an average particle size of the plurality of solid adduct particles 13 is less than or equal to about 1000 micrometers. In some embodiments, the plurality of solid adduct particles may be spherical or substantially spherical in shape. The average particle density of the plurality of solid adduct particles is in the range of about 1.1 grams per cubic centimeter to about 1.5 grams per cubic centimeter, in some embodiments.

In some embodiments, at least about 40 percent by volume of the $CO_2$ in the gas stream 12 reacts with the liquid sorbent in the reaction chamber 110. In some embodiments, at least about 60 percent by volume of the $CO_2$ in the gas stream 12 reacts with the liquid sorbent in the reaction chamber 110. In some embodiments, at least about 90 percent by volume of the $CO_2$ in the gas stream 12 react with the liquid sorbent in the reaction chamber 110.

In some embodiments, the method further includes forming a first $CO_2$-lean gas stream 14 in the reaction chamber 110, as indicated in FIG. 1. The term "first $CO_2$-lean gas stream" as used herein refers to a gas stream having a $CO_2$ content lower than that of the gas stream 12. In some embodiments, the first $CO_2$-lean gas stream 14 has a $CO_2$ content that is less than about 60 percent by volume of the $CO_2$ content in the gas stream 12. In some embodiments, the first $CO_2$-lean gas stream 14 has a $CO_2$ content that is less than about 40 percent by volume of the $CO_2$ content in the gas stream 12. In some embodiments, the first $CO_2$-lean gas stream 14 has a $CO_2$ content that is less than about 10 percent by volume of the $CO_2$ content in the gas stream 12.

In some embodiments, the method further includes forming an entrained gas stream 15, wherein the plurality of solid adduct particles 13 are entrained in the first $CO_2$-lean gas stream 14 in the reaction chamber 110 to form the entrained gas stream 15. The term "entrained gas stream" as used herein refers to a gas stream carrying or transporting the plurality of solid adduct particles. In some embodiments, in addition to the solid adduct particles, the entrained gas stream 15 may further include unreacted $CO_2$ gas, unreacted liquid sorbent droplets, or combinations thereof In some embodiments, the method further includes contacting the entrained gas stream 15 with a second liquid sorbent stream 20 in a separation unit 120, as indicated in FIG. 1. In some embodiments, the method may further include transferring the entrained gas stream 15 to the separator unit 120, as indicated in FIG. 1. In some embodiments, the separator 120 may be in fluid communication with the reaction chamber 110 via at least one outlet 105 in the reaction chamber 110.

In some embodiments, the method includes separating at least a portion of the plurality of solid adduct particles from the entrained gas stream 15 in the separation unit 120 by contacting the entrained gas stream 15 with a second liquid sorbent stream 20. The second liquid sorbent stream 20 includes a stream of liquid sorbent. Furthermore, as described in detail earlier, the liquid sorbent, in accordance with the embodiments of the invention, is in a liquid state, as compared to solid carbonate-based sorbent systems that further require additional carrier solvents (for example, aqueous solutions). In some embodiments, the second liquid sorbent stream 20 is substantially free of a co-solvent or a carrier fluid (for example, ionic liquids), wherein the term "substantially free" is defined herein earlier.

In some embodiments, the second liquid sorbent stream 20 includes a liquid sorbent that is different from liquid sorbent in the first liquid sorbent stream 10. In some embodiments, the second liquid sorbent stream 20 includes a liquid sorbent that is the same as the liquid sorbent in the first liquid sorbent stream 10. In some embodiments, the second liquid stream includes one or both of fresh liquid sorbent and regenerated liquid sorbent. In some embodiments, as described in detail below, the second liquid sorbent stream 20 includes at least a portion of regenerated liquid stream 41 from the desorption unit 140. In some embodiments, the second liquid sorbent stream 20 is a slipstream 41 of the regenerated liquid stream 40 that is recycled from the desorption unit 140 to the separation unit 120, as illustrated in FIG. 3.

In some embodiments, the second liquid sorbent stream 20 contacts the entrained gas stream 15 in the separation unit 120 such that at least a portion of the plurality of solid adduct particles are suspended in the second liquid sorbent stream 20 to form an adduct stream 25. The term "adduct stream" as used herein refers to a liquid sorbent stream containing a suspension of the plurality of solid adduct particles.

In some embodiments, the method includes forming a slurry of the plurality of solid adduct particles in the second liquid sorbent stream 20 in the separation unit 120. In some embodiments, the method advantageously provides for formation of a slurry in the separation unit 120, thus initiating the process of slurry formation (prior to the suspension unit 130) for the transfer of plurality of solid adduct particles to the desorption unit 140. In some embodiments, the method advantageously provides for use of the liquid sorbent as a slurry medium in the separation unit 120, thus excluding the need to separate the liquid slurry agent from the regenerated liquid sorbent and $CO_2$ gas in the desorption unit, and to avoid diluting the pure liquid sorbent.

In some embodiments, the entrained gas stream 15 may further include unreacted liquid sorbent droplets that had not reacted with the $CO_2$ in the reaction chamber 110. In some embodiments, the method may further include removing the liquid sorbent droplets or aerosols from the entrained gas stream 15 in the separation unit 120. As described in detail below, in some embodiments, the separation unit 120 may further include a mist eliminator, and the method may include the step of removing at least a portion of unreacted liquid sorbent droplets or aerosol in the mist eliminator.

In some embodiments, the entrained gas stream 15 may further include residual $CO_2$ gas that had not reacted with the first liquid sorbent stream 10 in the reaction chamber 110. In some embodiments, the liquid sorbent in the second liquid sorbent stream 20 reacts with the residual $CO_2$ gas in the entrained gas stream 15 to form a plurality of solid adduct particles, such that the separation unit 120 provides for additional reaction and capture of $CO_2$ gas. In such embodiments, the method may further include forming a plurality of solid adduct particles by reacting at least a portion of $CO_2$ gas in the entrained gas stream with the liquid sorbent, and separating at least a portion of the plurality of solid adduct particles (in addition to the solid adduct particles in the entrained gas stream 15) in the separation unit 120. In such embodiments, the adduct stream 25 may include at least a portion of the solid adduct particles formed in the separation unit 120 in addition to the plurality of solid adduct particles formed in the reaction chamber 110.

In some embodiments, the method includes separating at least about 60 weight percent of the plurality of solid adduct particles in the separation unit 120. In some embodiments, the method includes separating at least about 80 weight percent of the plurality of solid adduct particles in the separation unit 120. In some embodiments, the method includes separating at least about 95 weight percent of the plurality of solid adduct particles in the separation unit 120.

In some embodiments, the method further includes forming a second $CO_2$-lean gas stream 24 after the step of contacting the entrained gas stream 15 with the second liquid sorbent stream 20 in the separation unit 120. The term "second $CO_2$-lean gas stream" as used herein refers to a gas stream having a $CO_2$ content (in the form of adduct, pure $CO_2$ gas, or both) lower than the $CO_2$ content in the entrained gas stream 15 and the gas stream 12.

Figure 4:
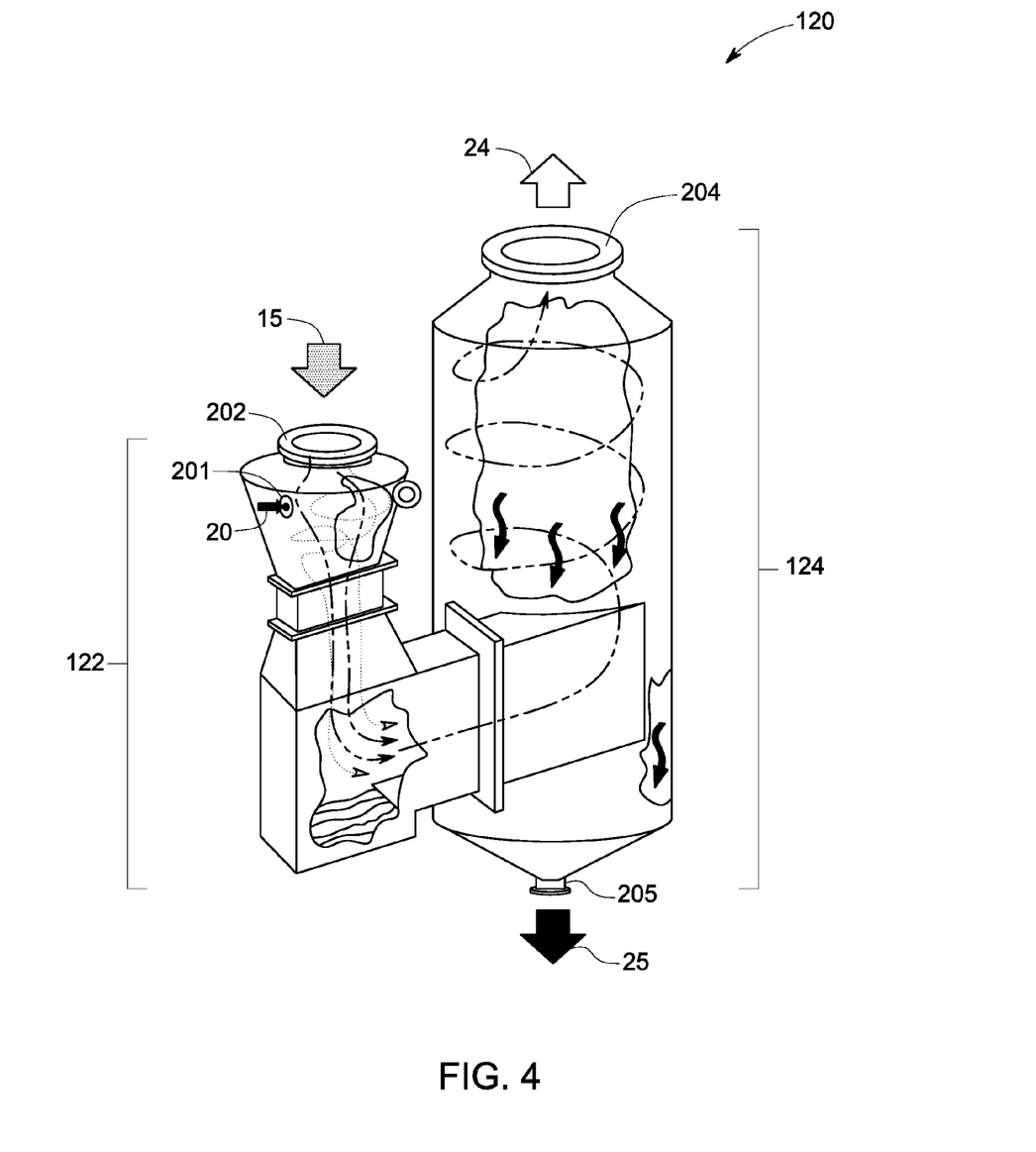
FIG. 4 is a schematic illustration of a separation unit, in accordance with one embodiment of the invention.

In some embodiments, the separation unit 120 is configured to provide contact between the second liquid sorbent stream 20 and the entrained gas stream 15 such that separation of the plurality of adduct particles from the gas stream occurs. In some embodiments, the separation unit 120 may include a first device configured to provide contact between the second liquid sorbent stream 20; and a second device configured to separate the adduct stream 25 from the second $CO_2$-lean gas stream 24. Non-limiting example of a suitable separation unit may include a wet scrubber. In some embodiments, the separation unit may further include a mist eliminator, a cyclone, or combinations thereof In some embodiments, an exemplary configuration of a suitable separation unit 120 includes a venturi scrubber 122 optionally equipped with a cyclonic separator 124, as illustrated in FIG. 4. As illustrated in FIG. 4, a venturi scrubber 122 may include multiple sections, for example, a converging section, a throat section, and a diverging section. An inlet gas stream can enter the converging section, and as the area decreases, gas velocity increases. Liquids are usually introduced at the throat, or at the entrance to the converging section. In a typical scenario, the gas stream is forced to move at very high velocities in the small throat section, shearing the liquid matter from the vessel walls. This action can produce a large number of very tiny droplets, which can react with the gas stream.

As illustrated in FIG. 4, the venturi scrubber 122 includes at least one inlet 202 to receive the entrained gas stream 15 and at least one inlet 201 to receive the second liquid sorbent stream 20. As illustrated in FIG. 4, the venturi scrubber 122 is further equipped with a cyclonic separator 124. The cyclonic separator 124 includes at least one discharge outlet 204 for the second $CO_2$-lean gas stream 24 and at least one discharge outlet 205 for the adduct stream 25.

As noted earlier, in particular embodiments, the separation unit 120 is configured to enable solids (for example, adduct particles) disengagement, aerosol (for example, liquid sorbent droplets) disengagement, $CO_2$ absorption, and slurry formation in a single process unit. This may advantageously result in one or more of reduced materials and capital cost, increased efficiency, simplified $CO_2$ capture process, and reduced overall footprint of the system.

In some embodiments, the method further includes discharging the second $CO_2$-lean gas stream 24 from the separation unit 120 via at least one outlet 204 in the separation unit 120, as indicated in FIGS. 1 and 4. The second $CO_2$-lean gas stream 24 may be further transported to another vessel or system for subsequent processing steps, in some embodiments.

As indicated in FIG. 1, the method further includes transporting the adduct stream 25 to a desorption unit 140, in some embodiments. In some embodiments, the method may further include transporting the adduct stream to the desorption unit via a suspension unit 130 (optional), as indicated in FIG. 2. In some embodiments, the method further includes contacting the adduct stream 25 with a third liquid sorbent stream 30 in a suspension unit 130 to form a slurry 35, and pressurizing and transporting the slurry 35 to the desorption unit 140.

In some embodiments, as indicated in FIG. 3, the suspension unit 130 is in fluid communication with the separation unit 120, and includes a slurry tank 132 in fluid communication with a slurry pump 134. The slurry tank 132 is configured to receive the adduct stream 25 from the separation unit 120 and is further configured to receive a third liquid sorbent stream 30, and the slurry pump 134 is configured to pressurize the slurry and transport it to the desorption unit 140. Exemplary slurry tanks include a vessel configured to receive both the adduct stream 25 and the third liquid stream 30, such as, without limitation, a hopper, continuous stirred tank reactor (CSTR), or combinations thereof As noted earlier, the step of slurry formation includes introducing a third liquid sorbent stream 30 in the slurry tank 132. In some embodiments, the third liquid stream includes one or both of fresh liquid sorbent and regenerated liquid sorbent. In some embodiments, as described in detail below, the third liquid sorbent stream 30 includes at least a portion of regenerated liquid stream 40 from the desorption unit 140. In some embodiments, the third liquid sorbent stream 30 is a slipstream 43 of the regenerated liquid stream 40 that is recycled from the desorption unit 140 to the suspension unit 130, as illustrated in FIG. 3. In some embodiments, the method advantageously provides for use of the liquid sorbent as a slurry medium in the suspension unit, thus excluding the need to separate the liquid slurry agent from the regenerated liquid sorbent and $CO_2$ gas in the desorption unit, and to avoid diluting the pure liquid sorbent.

In some embodiments, after the step of slurry formation, the slurry 35 may be pressurized in a slurry pump 134 that delivers the slurry, under pressure, to the desorption unit 140. In some embodiments, by delivering the slurry under pressure, the compression duty needed for $CO_2$ sequestration may be reduced. In some embodiments, the pressure of the slurry is suitable for injection into the desorption unit (that is, greater than the desorption pressure). Slurry pumps effective for use as described herein will be well known to those having skill in the art and are commercially available.

In some embodiments, the desorption unit 140 is configured to desorb the $CO_2$ from the plurality of solid adduct particles releasing $CO_2$ gas and regenerating the liquid sorbent, at an increased pressure. As noted earlier, in some embodiments, the slurry pump pressurizes the solid adduct particles prior to delivery into the desorption unit 140. In such embodiments the compression duty needed for sequestration of the $CO_2$ may be reduced compared to a system that desorbs $CO_2$ at near-atmospheric pressure (for example, an amine-based system). Exemplary desorption units 140 for use in the system 100 may include, without limitation, continuous stirred tank reactors (CSTR), and other like desorption vessels.

In some embodiments, the method includes heating the plurality of solid adduct particles in the desorption unit 140 to a desorption temperature. In some embodiments, the desorption temperature may depend on the composition and size of the solid particles; the amount of $CO_2$ bound within the particles; the decomposition temperature of the liquid sorbent; and pressure conditions within desorption unit 140. In some embodiments, the desorption temperature is in a range from about 70 degrees Celsius to about 150 degrees Celsius. In some embodiments, the desorption pressure in the desorption unit 140 is greater than about 1 atm. In some embodiments, the desorption pressure in the desorption unit 140 is greater than about 2 atm. In some embodiments, the desorption pressure in the desorption unit 140 is in a range from about 2 atm to about 20 atm.

As noted earlier, the method further includes forming a regenerated liquid sorbent stream 40 in the desorption unit 140. In some embodiments, the regenerated liquid sorbent stream 40 may be directed to treatment, storage, or disposal facilities via at least one outlet 401. In particular embodiments, regenerated liquid sorbent stream 40 is circulated back to the reaction chamber 110, as illustrated in FIG. 3. In some embodiments, the regenerated liquid sorbent stream 40 may be introduced by itself to the reaction chamber 110, to react with additional $CO_2$ from the gas stream, thereby forming more $CO_2$-bound solid material in a closed loop process. In such embodiments, the first liquid sorbent stream 10 is the regenerated liquid sorbent stream 40, and a separate liquid sorbent source 111 may not be required. In some other embodiments, the regenerated liquid sorbent stream 40 may be combined with a fresh first liquid sorbent stream 10; or may be added to the reaction chamber 110 as a separate feed, along with the first liquid sorbent stream 10.

Further, in some embodiments, a slipstream 41 of the regenerated liquid sorbent stream 40 may be split off from the recycle stream of the regenerated liquid sorbent stream 40, and directed to the separation unit 120, as indicated in FIGS. 2 and 3. In some embodiments, the slipstream 41 may be introduced by itself to the separation unit 120, to form a slurry with the plurality of solid adduct particles. In such embodiments, the second liquid sorbent stream 20 is the slipstream 41, as indicated in FIGS. 2 and 3. In some other embodiments, the slipstream 41 may be combined with fresh second liquid sorbent stream 20; or may be added to the separation unit 120 as a separate feed, along with the second liquid sorbent stream 20 (not shown).

Furthermore, in some embodiments, a slipstream 43 of the regenerated liquid sorbent stream 40 may be split off from the recycle stream of the regenerated liquid sorbent stream 40, and directed to the suspension unit 130 (for example, slurry tank 132), as indicated in FIGS. 2 and 3. In some embodiments, the slipstream 43 may be introduced by itself to the suspension unit 130, to form a slurry with the plurality of solid adduct particles. In such embodiments, the third liquid sorbent stream 30 is the slipstream 43, as indicated in FIGS. 2 and 3. In some other embodiments, the slipstream 43 may be combined with fresh third liquid sorbent stream 30; or may be added to the suspension unit 130 as a separate feed, along with the third liquid sorbent stream 30 (not shown).

Referring again to FIG. 1, in some embodiments, the method includes releasing at least a portion of $CO_2$ gas bound in the plurality of solid adduct particles to form a $CO_2$ stream 42. In some embodiments, the $CO_2$ stream 42 may include substantially pure $CO_2$ gas, and in some embodiments may further include impurities, such as additional absorbed gases or sorbent. In some embodiments, the substantially pure $CO_2$ stream 42 is released or otherwise directed out of the desorption unit 140 by at least one discharge outlet 402. In some embodiments, the $CO_2$ stream 42 is compressed or purified, for example, for re-use, or for transport to an end-use location. In some embodiments, the $CO_2$ stream 42 may be used for enhanced oil recovery, $CO_2$ storage, or $CO_2$ sequestration.

In some embodiments, and as described earlier, a system 100 for separating carbon dioxide ($CO_2$) from a gas stream 12 is provided, as indicated in FIGS. 1-3. In some embodiments, the system 100 includes a reaction chamber 110 configured to receive a first liquid sorbent stream 10 and a gas stream 12, as indicated in FIG. 1. The reaction chamber 110 is configured to react at least a portion of $CO_2$ in the gas stream 10 with the liquid sorbent to form an entrained gas stream 15 including a plurality of solid adduct particles 13. In some embodiments, the system further includes a liquid sorbent source 111 in fluid communication with the reaction chamber 110.

In some embodiments, the system 100 further includes a separation unit 120 in fluid communication with the reaction chamber 110. The separation unit 120 is configured to receive the entrained gas stream 15 and a second liquid-sorbent stream 20. The separation unit 120 is further configured to separate at least a portion of the plurality of solid particles from the entrained gas stream 15 to form an adduct stream 25 and a $CO_2$-lean gas stream 24. In some embodiments, and as described earlier, the separation unit 120 includes a wet-scrubber equipped with a mist eliminator, a cyclone, or combinations thereof In some embodiments, the system 100 further includes a suspension unit 130 in fluid communication with the separation unit 120, wherein the suspension unit 130 includes a slurry tank 132 in fluid communication with a slurry pump 134, as indicated in FIGS. 2 and 3. In some embodiments, the slurry tank 132 is configured to receive a third liquid sorbent stream 30 and the adduct stream 25. In some embodiments, the slurry tank 132 is configured to form a slurry 35, and the slurry pump 134 is configured to pressurize the slurry and transport it to the desorption unit 140.

In some embodiments, the system 100 further includes a desorption unit 140 in fluid communication with the separation unit 120. In some embodiments, the desorption unit 140 is in fluid communication with the separation unit 120 via the suspension unit 130, wherein the suspension unit 130 functions as a transport mechanism for the adduct stream 25. The desorption unit 140 is configured to receive the slurry 35 of the plurality of adduct particles, and the desorption unit 140 is configured to decompose the adduct to form a $CO_2$ stream 42 and a regenerated liquid-sorbent stream 40.

With the foregoing in mind, systems and methods for separating $CO_2$ from a gas stream, according to some exemplary embodiments of the invention, are further described herein. Turning now to FIG. 1, in one embodiment, a method of separating CO2 from a gas stream 12 is provided. The method includes contacting a first liquid sorbent stream 10 including a plurality of liquid sorbent particles with the gas stream 12 in a reaction chamber 110. The method further includes reacting at least a portion of $CO_2$ in the gas stream 12 with the liquid sorbent to form a plurality of solid adduct particles 13 and a first $CO_2$-lean gas stream 14. In some embodiments, the solid adduct particles 13 are entrained in the first $CO_2$-lean gas stream 14 to form an entrained gas stream 15, as indicated in FIG. 1.

The method further includes contacting the entrained gas stream 15 with a second liquid sorbent stream 20 in a separation unit 120, thereby separating at least a portion of the plurality of solid particles from the entrained gas stream 15 to form an adduct stream 25 and a second $CO_2$-lean gas stream 24. The method further includes heating at least a portion of the adduct stream 25 in a desorption unit 140 to form a $CO_2$ stream 42 and a regenerated liquid sorbent stream 40.

Turning now to FIG. 2 in one embodiment, a method and a system for separating $CO_2$ from a gas stream 12 is provided. The method and system is similar to the system and method illustrated in FIG. 1, with the addition that the desorption unit 140 is in fluid communication with the separation unit 120 via a suspension unit 130. In such embodiments, the method includes contacting the adduct stream 25 with a third liquid sorbent stream 30 in the suspension unit 130 to form a slurry 35 and transporting the slurry 35 to the desorption unit 140. The method further includes heating at least a portion of slurry 35 in the desorption unit 140 to form the $CO_2$ stream 42 and the regenerated liquid sorbent stream 40.

The method as illustrated in FIG. 2 further includes circulating the regenerated liquid sorbent stream 40 to the reaction chamber 110. As illustrated in FIG. 2, in some embodiments, the system may further include a pump 142 configured to pressurize the regenerated liquid sorbent stream before circulating it to the reaction chamber 110. Furthermore, in some embodiments, the method includes circulating a slipstream 41 of the regenerated liquid sorbent stream 40 to the separation unit 120, as indicated in FIG. 2. In such embodiments, the slipstream 41 is itself the second liquid sorbent stream 20 (as indicated in FIG. 2); or is combined with a separate second liquid sorbent stream 20 (not shown). In some further embodiments, the methods includes circulating a slipstream 43 of the regenerated liquid sorbent stream 40 to the suspension unit 130, as indicated in FIG. 2. In such embodiments, the slipstream 43 is itself the second liquid sorbent stream 30 (as indicated in FIG. 2); or is combined with a separate third liquid sorbent stream 30 (not shown).

Turning now to FIG. 3 in one embodiment, a method and a system for separating $CO_2$ from a gas stream 12 is provided. The method and system is similar to the system and method illustrated in FIG. 2, with the addition that the system 100 further includes one or more heat exchanger 143 in fluid communication with the slurry stream 35 and the regenerated liquid sorbent stream 40. In some embodiments, the regenerated liquid sorbent stream 40 may be at a higher temperature than the slurry stream 35 after the heating and desorption step. In some embodiments, the regenerated liquid sorbent stream 40 may transfer some of the heat to the slurry stream 35 prior to directing the slurry stream to the desorption unit 140. In some embodiments, as indicated in FIG. 3, the regenerated liquid sorbent stream may be further cooled using one or more coolers 144.

Further, as indicated in FIG. 3, in some embodiments, the method may include cooling and condensing the $CO_2$ stream using one or more cooler 145 and condenser 146 to form a condensed $CO_2$ stream 44, as indicated in FIG. 3. In some embodiments, at least a portion 46 of the condensed $CO_2$ stream 44 may be circulated back to the desorption unit 140.

As noted earlier, the liquid sorbent based $CO_2$ separation systems advantageously provide for energy-efficient and cost-effective capture of $CO_2$. In some embodiments, energy may be saved by using the liquid sorbent to form, separate, and slurry the plurality of adduct particles, thereby not having to pump, heat, or cool the larger volumes of fluid used by systems employing non-absorbing co-solvents different from the sorbent. Moreover, when the slipstream of regenerated liquid sorbent is used to separate the solid particles or to form a slurry, no additional liquids may be required in the system. This may advantageously result in reduced materials and capital cost, increased efficiency, simplified $CO_2$ capture process, and reduce the overall footprint of the system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for separating carbon dioxide ($CO_2$) from a gas stream, comprising:
    (i) a reaction chamber configured to receive a first liquid sorbent stream and the gas stream, wherein the reaction chamber is configured to react at least a portion of $CO_2$ in the gas stream with the first liquid sorbent stream to form an entrained gas stream comprising a plurality of solid adduct particles;
    (iii) a separation unit in fluid communication with the reaction chamber, wherein the separation unit is configured to receive the entrained gas stream and a second liquid-sorbent stream, and wherein the separation unit is configured to separate at least a portion of the plurality of solid adduct particles from the entrained gas stream to form an adduct stream and $CO_2$-lean gas stream; and
    (iii) a desorption unit in fluid communication with the separation unit, wherein the desorption unit is configured to receive the adduct stream, and wherein the desorption unit is configured to decompose the plurality of solid adduct particles to form a $CO_2$ stream and a regenerated liquid-sorbent stream.

2. The system of claim 1, wherein the reaction chamber is configured to receive the gas stream via an inlet that is located in a lower region of the reaction chamber relative to an inlet for receiving the first liquid sorbent stream.

3. The system of claim 1, wherein the reaction chamber is configured to transfer the entrained gas stream from the reaction chamber to the separation unit via an outlet that is located in a lower region off the reaction chamber relative to an inlet for receiving the first liquid sorbent stream.

4. The system of claim 1, wherein the first liquid sorbent stream comprises a liquid sorbent.

5. The system of claim 4, wherein the liquid sorbent comprises an amino siloxane.

6. The system of claim 1, wherein the plurality of solid adduct particles comprises a carbamate, a bicarbonate, or a combination thereof.

7. The system of claim 1, wherein the first liquid sorbent stream and the second liquid sorbent stream are substantially free of a solvent selected from the group consisting of water, ionic liquids, and combinations thereof.

8. The system of claim 1, wherein the separation unit comprises a wet-scrubber comprising a mist eliminator, a cyclone, or combinations thereof.

9. The system of claim 1, further comprising a suspension unit in fluid communication with the separation unit, wherein the suspension unit comprises a slurry tank in fluid communication with a slurry pump, and wherein the slurry tank is configured to receive a third liquid sorbent stream and the adduct stream from the separation unit to form a slurry, and the slurry pump is configured to pressurize the slurry and transport it to the desorption unit.

10. The system of claim 9, wherein the third liquid sorbent stream comprises at least a portion of the regenerated liquid sorbent stream.

* * * * *